United States Patent [19]

Foulard et al.

[11] Patent Number: 4,518,421

[45] Date of Patent: May 21, 1985

[54] PROCESS FOR PRODUCING SOLID METAL PARTICLES FROM A BATH OF METAL

[75] Inventors: Jean Foulard, Ablon; Jean F. Rimbert, Igny; Gilles Vernet, Paris; Albert-Gilbert Goursat, Voisins-le-Bretonneux, all of France

[73] Assignee: L'Air Liquide, Societe Anonyme pour l'Etude et l'Exploitation des Procedes Georges Claude, Paris, France

[21] Appl. No.: 605,779

[22] Filed: May 1, 1984

[30] Foreign Application Priority Data

May 4, 1983 [FR] France ................................. 83 07415

[51] Int. Cl.³ .............................................. C21C 7/10
[52] U.S. Cl. .......................................... 75/49; 75/63; 75/65 R
[58] Field of Search .................. 75/63, 65 R, 49, 53, 75/93 R

[56] References Cited

U.S. PATENT DOCUMENTS 3,543,531  12/1970  Adams ................................. 75/63
4,309,214  1/1982  Foulard et al. ..................... 75/0.5 B Primary Examiner—Peter D. Rosenberg
Attorney, Agent, or Firm—Lee C. Robinson, Jr.

[57] ABSTRACT

The process concerns a selective refining of molten metals or alloys contained in a closed treatment container in the form of a bath 10. A solid or liquid cryogenic body 13 is brought into contact with the surface of the bath of metal 10 so as to convert, by evaporation-condensation, the vapors (vz) of the impurity or impurities to be eliminated from the bath into solid particles (pz) entrained by the vapors (vf) of the cryogenic body, and the bath of metal 10 is simultaneously stirred.

16 Claims, 3 Drawing Figures

PROCESS FOR PRODUCING SOLID METAL PARTICLES FROM A BATH OF METAL

The present invention relates to a selective refining process for molten metals or alloys.

In metallurgy, a large number of problems are encountered which are caused by certain residual elements which, if they are not eliminated, considerably affect the final properties of the metals or alloys obtained. Attempts have therefore been made to eliminate the residual impurities from a bath of metal and a certain number of processes have consequently been employed. Among these processes, there may be mentioned for example the chemical processes based on the difference of affinity of the components of the bath for a given chemical compound, these processes involving chemical reactions obtained with gases such as oxygen, chlorine, fluorine, or solids such as lime, the electro-chemical processes, filtration, distillation under a vacuum when the usual reagents are unsuitable, the refining by bubbling inert gas, or a combination of the last two techniques.

Among the aforementioned known refining processes, refining by distillation under a vacuum and refining by the bubbling of inert gas both employ the difference in partial pressures of the impurities of the metal to be refined in the atmosphere in equilibrium with the bath. The renewal of this atmosphere by means of the vacuum or by the blowing of the inert gas proper permits, for a volatile component, the displacement of the equilibrium between the impurity in solution in the metal and the impurity in the gaseous state, in the vaporization direction, so that the content of the impurity in the bath decreases. This refining principle by "pumping" of the volatile impurities in the vapour phase is widely used on an industrial scale. However, these two processes have a number of drawbacks.

In the case of distillation under a vacuum, the principal drawback of this technique resides in a very high investment cost relates to the size of the equipment and the necessity to obtain high vacuums. Another drawback of this technique is the possibility of a surface oxidation of the bath of metal owing to the fact that the partial pressure of oxygen above the bath while low is not nil. This surface oxidation decreases the rate of evaporation of the impurities and consequently limits the possibilities of this technique.

Further, the efficiency of the operation is insufficient owing to the fact that the thermal gradient between the cold source (the walls of the equipment) and the hot source (the surface of the bath of metal) is very small bearing in mind the distances therebetween: the thermal exchanges and consequently the reactions are therefore slow.

In the case of the refining by means of an inert gas, the fact that the partial pressure of a residual compound in the bubble of an inert gas in equilibrium with the bath remains often very low, it is necessary to inject very large quantities of gas in order to reduce significantly the content of this compound. In certain particular cases, a possible solution for avoiding this difficulty consists in adding into the inert gas another gas which is very reactive relative to the compound to be eliminated, such as chlorine or fluorine, so as to promote the shifting of the equilibrium in the direction of evaporation by a chemical effect. This solution is imperfect since it poses serious problems of generation of toxic gases and therefore requires recovery of these toxic gases.

In another field, namely that of the production of metal powders from a molten metal or alloy, there is also known a process such as that disclosed in the commonly assigned U.S. Pat. No. 4,309,214, which comprises bringing a cryogenic body to the liquid state in contact with the surface of the bath of metal to be treated so as to form, by evaporation-condensation, solid particles which are thereafter separated from the cryogenic fluid and collected so as to obtain the desired powder.

An object of the present invention is to take advantage of this technique for producing metal powders so as to improve the refining conditions of a bath of molten metal or alloy.

For this purpose, this process for the selective refining of molten metals or alloys contained in a closed treatment container comprises bringing in contact with the surface of the bath of metal a solid or liquid cryogenic body i.e., a mass of cryogenic liquid or solid material so as to convert the vapours of the impurity or impurities which must be eliminated from the bath, into solid particles entrained by the vapours of the cryogenic body, and simultaneously stirring the bath of metal.

The stirring of the bath of metal, which increases the surface of contact between the liquid bath of metal and the cryogenic body, and which consequently markedly increases the productivity of the process, may be achieved by any suitable known means, in particular by pneumatic, mechanical, electromagnetic means etc., and this stirring at the same time homogenizes the bath during the treatment. Preferably, the stirring is pneumatic by blowing into the bath of metal a gas which is preferably inert relative to this bath, this gas bursting into fine bubbles in the bath.

The cryogenic body poured onto the surface of the bath of metal may be constituted by a liquidified gas which is preferably inert relative to the bath of metal, such as nitrogen, argon, helium. The cryogenic liquid poured forms a liquid layer which covers the surface of the bath of metal but which, owing to the calefaction phenomenon, is isolated from the surface of the bath by a gaseous intermediate layer. In this intermediate layer, the cryogenic liquid, in the vicinity of the surface of the bath, starts to heat and the cold vapours thus formed highly cool the vapours of the impurities coming from the bath of metal and very rapidly condenses them in the form of solid particles which are then entrained upwardly by the remainder of the cryogenic liquid vapours. This direct passage of the vapours of metal impurities to the solid state shifts the equilibrium between impurities in the liquid state and impurities in the vapour state which exerts a suction on the other vapours of impurities coming from the bath of metal which are immediately condensed in the form of solid particles and entrained upwardly, and so on. This therefore concerns a phenomenon of "pumping" owing to the use, according to the invnetion, of a cryogenic liquid which considerably increases the productivity of the process.

Further, the fact that, according to the invention, the bath of metal is subjected to a stirring, permits a marked increase in the pumping described hereinbefore. Indeed, in the absence of stirring, the bath of metal will become poorer in volatile impurities in the vicinity of the surface of contact between the bath of metal and the cryogenic liquid which will create a gradient of concentration of the volatile impurities within the bath of metal. Further, a temperature difference may appear between the surface of contact between the bath and the cryogenic liquid on one hand and the remainder of the bath on the other hand. The existence of these two gradients (concentration and thermal) has a harmful effect on the rate of evaporation of the volatile impurities to be eliminated, and therefore considerably prolongs the treatment time. Also, a stirring of the bath of metal overcomes these drawbacks by homogenizing said bath and consequently by renewing the surface of contact between the cryogenic liquid and the bath of metal. Further, the stirring, which increases the surface of contact, and therefore the thermal exchanges in this region, increases the rapidity of the conversion of the vapours of metal impurities into solid particles and their discharge from above.

When the cryogenic body employed in the process according to the invention is in the liquid state, the container containing the bath of metal is maintained either at atmospheric pressure or at a pressure higher than atmospheric pressure. The fact of operating at a pressure higher than atmospheric pressure permits an increase in the rate of formation of vapours of metal impurities and consequently of condensation of the solid particles, i.e. a corresponding reduction in the required duration of the refining treatment. Indeed, a higher operating pressure physically obliges the layer of cryogenic liquid to be closer to the surface of the bath of metal. Thus, the thickness of the gaseous layer between the surface of the bath of metal and the layer of cryogenic liquid is smaller and the cold vapours of the cryogenic liquid more rapidly cool the vapours of the metal impurities and consequently the "pumping" phenomenon described before is more rapid.

According to a modification of the manner of carrying out the invention, the cryogenic body deposited on the surface of the bath of metal is in a solid phase and formed by a solidified gas which is preferably inert relative to the bath of metal, such as nitrogen, argon, helium. $CO_2$ may also be employed as a solid cryogenic body. In this case, the total pressure at which the container containing the bath of metal is maintained is lower than atmospheric pressure, which enables the bath of metal to be heated at less elevated temperatures. The cryogenic solid floats, as the cryogenic liquid previously, on the surface of the bath of metal and, owing to the calefaction phenomenon, it is separated therefrom by a gaseous layer. The cryogenic solid progressively sublimes in the container under low pressure and the cold vapours thus produced condense the vapours of metal impurities coming from the bath directly in the form of solid particles so that the same pumping phenomenon described before is produced. The bath of metal is also stirred when $CO_2$ is used, as is the case where a cryogenic liquid is used.

The process according to the invention may be applied, in metallurgy, to the refining of various metals and alloys, for example to the elimination of copper, tin, lead, zinc, bismuth, tellurium, etc., from steel, to the elimination of aluminium and calcium from silicon, and to the elimination of zinc, lithium, sodium and magnesium from aluminium.

The temperature at which the bath of metal is brought also plays a part in the process according to the invention. Indeed, the bath of metal is brought to a temperature which depends on the partial pressure of the most volatile impurity that is desired to be eliminated.

There will now be described by way of an example, to which the scope of the invention is not intended to be limited, one embodiment of a method of carrying out the invention with reference to the accompanying drawing, in which.

Figure 1:
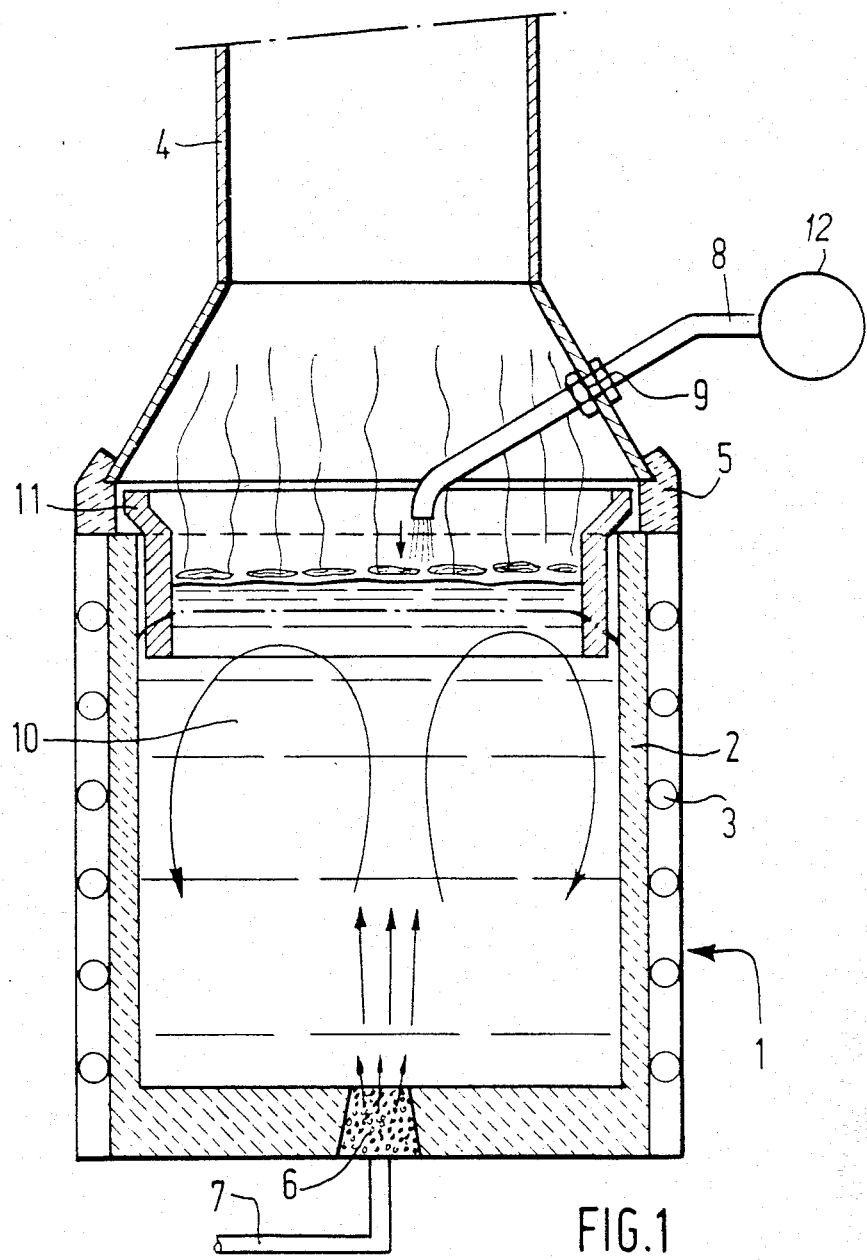
FIG. 1 is a vertical sectional view of a furnace in which the process according to the invention is carried out.

Equipment for carrying out the process according to the invention, shown diagrammatically partly in FIG. 1, comprises an induction furnace 1 provided with a refractory lining 2 and induction coil 3. This furnace 1 is surmounted by a hood 4 and the sealing between the furnace 1 and the hood 4 is provided by a sealing element 5. A porous refractory element 6 is incorporated in the bottom of the internal refractory lining 2 of the furnace 1 and it is connected, through a pipe 7, to a source of inert gas under pressure (not shown in FIG. 1). A pouring spout 8 extends through the wall of the hood 4 through an aperture 9 and is connected to a container 12 storing a cryogenic liquid formed by a liquified neutral gas.

By way of example, there will be described the carrying out of the process according to the invention for refining an aluminium and zinc alloy into pure aluminum by the elimination of the impurity formed by the zinc.

Figure 2:
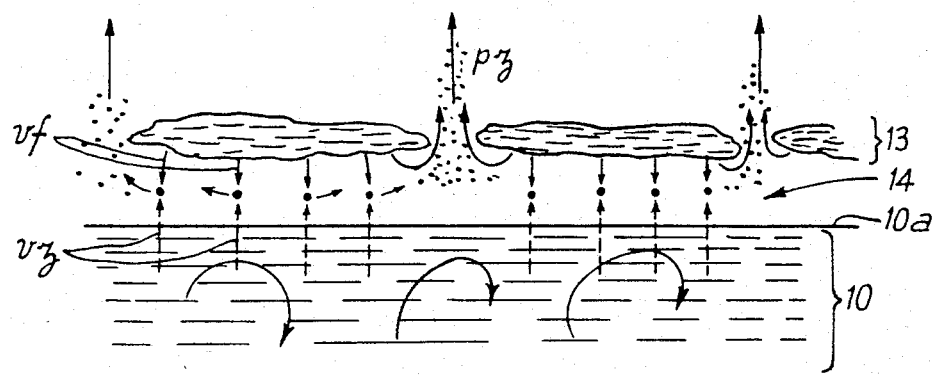
FIG. 2 is a diagrammatic view, to an enlarged scale, of the upper part of the bath on which the cryogenic body has been poured during the refining operation.

This aluminium and zinc alloy is placed in the furnace 1 and brought to a temperature higher than 1000° C. so that a bath of liquid metal 10 is formed. Thereafter, the liquified inert gas is poured by the pouring spout 8 onto the surface 10a of the bath 10 so as to form a liquid layer in fact formed by a group of "puddles" 13 (FIG. 2) which cover the surface 10a of the bath of metal but which, owing to the calefaction phenomenon, are isolated from this surface 10a by a gaseous intermediate layer 14. There is also injected, through the porous refractory element 6 provided in the bottom, a stream of inert gas with a rate of flow of 1 to 3 $m^3$/hour so as to stir the bath 10. The impurity formed by the zinc is vaporized and produces zinc vapours indicated by the arrows (in dashes) vz in FIG. 2. Upon contact of the cold vapours resulting from the heating of the cryogenic liquid and represented by the arrows vf shown in full lines, the zinc is condensed in the form of solid particles pz which are entrained upwardly through the hood 4 by the remainder of the vapours vf of the cryogenic liquid to an apparatus for effecting an adapted removal of dust and recovery of the impurith and of the cryogen.

The results obtained for three different tests carried out on the same aluminium-zinc alloy, but with different charges of this alloy and heated at different temperatures will now be given in the following table.

|  | METAL CHARGE kg | BATH TEMPERATURE °C. | INITIAL CONTENT OF Zn % | FINAL CONTENT OF Zn % |
|---|---|---|---|---|
| TEST 1 | 85 | 840 | 3.2 | 2.8 |
| TEST 2 | 90 | 900 | 0.40 | 0.30 |
| TEST 3 | 100 | 1,200 | 0.38 | 0.07 |

Figure 3:
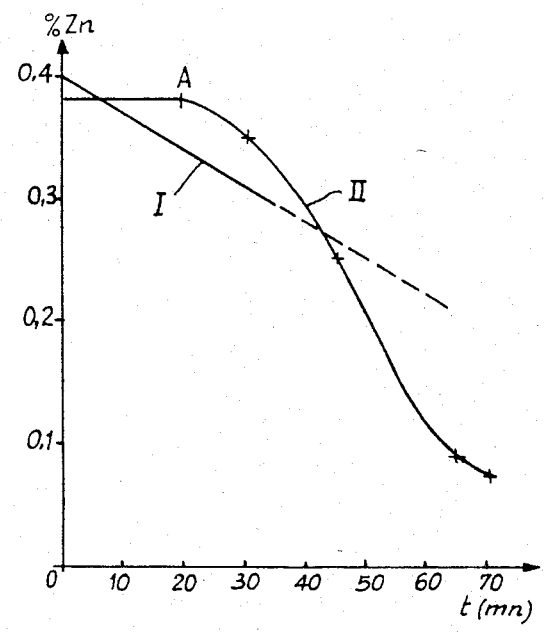
FIG. 3 is a diagram illustrating the variation overtime in the zinc content of a bath of metal containing aluminium and zinc, in the case of two different tests.

FIG. 3 shows the straight line I and the curve II giving the evolution of the zinc content (in % by weight) with respect to the treatment time (in minutes), respectively in respect of test No 2 and test No 3. In test No 2, the liquified inert gas is poured right from the start of the refining treatment while in test No 3 the treatment proper (pouring of the liquified inert gas onto the surface of the bath and stirring of the latter) is started only after having heated the alloy for a certain period (see point A of curve II). It can be seen from FIG. 3 that the impurity formed by the zinc is eliminated very rapidly in all cases.

In the event that a furnace having a medium frequency is employed, the surface of the bath of metal 10 has the shape of a meniscus. In order to ensure that the internal layer of liquified gas 13 covers only the planar part of this surface, a refractory ring 11 is placed in the upper part of the furnace 1.

What is claimed is:

1. A process for selectively refining molten metal contained in a closed treatment container to remove an impurity from said metal, said process comprising
   heating a metal to be refined in said container to a temperature sufficient to melt the metal to form a bath of the molten metal and sufficient to vaporize the impurity from an upper surface of the bath of molten metal;
   bringing a cryogenic material into close contact with the upper surface of said bath of molten metal so that the cryogenic material vaporizes against said surface by calefaction to form a gaseous layer atop said surface; with the vapor of said cryogenic material contacting vapor of said impurity and condensing the same to form impurity particles entrained within said gaseous layer; and
   removing from said container the impurity particles entrained in the vapor of said cryogenic material.

2. A process according to claim 1, wherein said cryogenic material is a solid.

3. A process according to claim 1, wherein said cryogenic material is a liquid.

4. A process according to claim 3, wherein the cryogenic liquid is poured onto the surface of the bath of metal and the container is maintained at a pressure at least equal to atmospheric pressure.

5. A process according to claim 2, wherein the cryogenic solid is deposited on the surface of the bath of metal and the container is maintained at a pressure lower than atmospheric pressure.

6. A process according to claim 1, wherein the cryogenic material is formed by a substance which is chemically inert with respect to the bath of metal.

7. A process according to claim 6, wherein said cryogenic material is selected from the group consisting of nitrogen, argon, helium and carbon dioxide.

8. A process according to claim 7, wherein said cryogenic material is in the liquid state.

9. A process according to claim 1, further comprising stirring said bath of molten metal concurrently.

10. A process according to claim 9, wherein the bath of metal is stirred by blowing a gas into the bath through a porous refractory element incorporated in a bottom wall of the container containing the bath.

11. A process according to claim 10, wherein the blown stirring gas is a gas which is chemically inert with respect to the bath of metal.

12. A process according to claim 11, wherein said blown stirring gas is selected from the group consisting of nitrogen, argon and helium.

13. A process according to claim 1, wherein the bath of metal is formed by a metal which is at least substantially pure.

14. A process according to claim 1, wherein the bath of metal is formed by a mixture of at least two metals.

15. A process according to claim 7, wherein said cryogenic material is in the solid state.

16. A process according to claim 1, wherein the step of removing includes drawing off the vapor of the cryogenic material with the impurity particles entrained therein.

* * * * *